(12) United States Patent
Tsuji et al.

(10) Patent No.: US 9,385,378 B2
(45) Date of Patent: Jul. 5, 2016

(54) METHOD FOR MANUFACTURING LEAD-ACID BATTERY

(71) Applicant: Shin-Kobe Electric Machinery Co.,. Ltd., Tokyo (JP)

(72) Inventors: Hiroki Tsuji, Saitama (JP); Masatoshi Miyatsuka, Saitama (JP); Kazuya Sasaki, Saitama (JP); Naoki Tsuji, Saitama (JP); Kenichi Maeda, Saitama (JP); Yoshifumi Yamada, Saitama (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 14/640,854

(22) Filed: Mar. 6, 2015

(65) Prior Publication Data

US 2015/0180048 A1    Jun. 25, 2015

Related U.S. Application Data

(63) Continuation of application No. 13/047,153, filed on Mar. 14, 2011, now Pat. No. 8,999,572.

(30) Foreign Application Priority Data

Sep. 13, 2010  (JP) ................................. 2010-203860
Dec. 14, 2010  (JP) ................................. 2010-277694

(51) Int. Cl.
*H01M 6/00*    (2006.01)
*H01M 2/26*    (2006.01)
*H01M 2/30*    (2006.01)
*H01M 4/73*    (2006.01)
*H01M 4/74*    (2006.01)
*H01M 10/06*   (2006.01)
*H01M 10/12*   (2006.01)

(52) U.S. Cl.
CPC .............. *H01M 6/005* (2013.01); *H01M 2/266* (2013.01); *H01M 2/305* (2013.01); *H01M 4/73* (2013.01); *H01M 4/742* (2013.01); *H01M 4/745* (2013.01); *H01M 10/06* (2013.01); *H01M 10/12* (2013.01); *Y02E 60/126* (2013.01); *Y02P 70/54* (2015.11); *Y10T 29/49108* (2015.01)

(58) Field of Classification Search
None
See application file for complete search history.

(56) References Cited

FOREIGN PATENT DOCUMENTS

| JP | H01-127169 | 8/1989 |
|----|------------|--------|
| JP | 4-218260   | 8/1992 |

(Continued)

OTHER PUBLICATIONS

English translation of Katsuhiro 07-326359 Sep. 14, 2015.*

*Primary Examiner* — Sarah A Slifka
(74) *Attorney, Agent, or Firm* — Fitch, Even, Tabin and Flannery LLP

(57) ABSTRACT

Provided herein is a lead-acid battery for which the risk of breakage of a current collecting lug part of a plate while in use is eliminated by simple means. At least a positive plate group of the lead-acid battery includes: one or more plates each including a current collector having a current collecting portion formed by expanding or punching a lead alloy sheet manufactured by cold rolling, and one or more current collecting lug parts unitarily formed with the current collecting portion; and a strap formed by a cast-on strap casting method and coupled to the one or more current collecting lug parts. The current collecting lug part is formed with an elongated protrusion extending in a direction away from the current collecting portion. The elongated protrusion continuously extends in a direction toward the current collecting portion of the plate from inside the strap.

1 Claim, 8 Drawing Sheets

(56) References Cited

FOREIGN PATENT DOCUMENTS

| | | |
|---|---|---|
| JP | 07-094190 | 4/1995 |
| JP | 07-326359 | 12/1995 |
| JP | 08-0107438 | 1/1996 |
| JP | 11-045697 | 2/1999 |
| JP | 11-111329 | 4/1999 |
| JP | 11-329373 | 11/1999 |
| JP | 2003-297414 | 10/2003 |
| JP | 2008-171701 | 7/2008 |

* cited by examiner

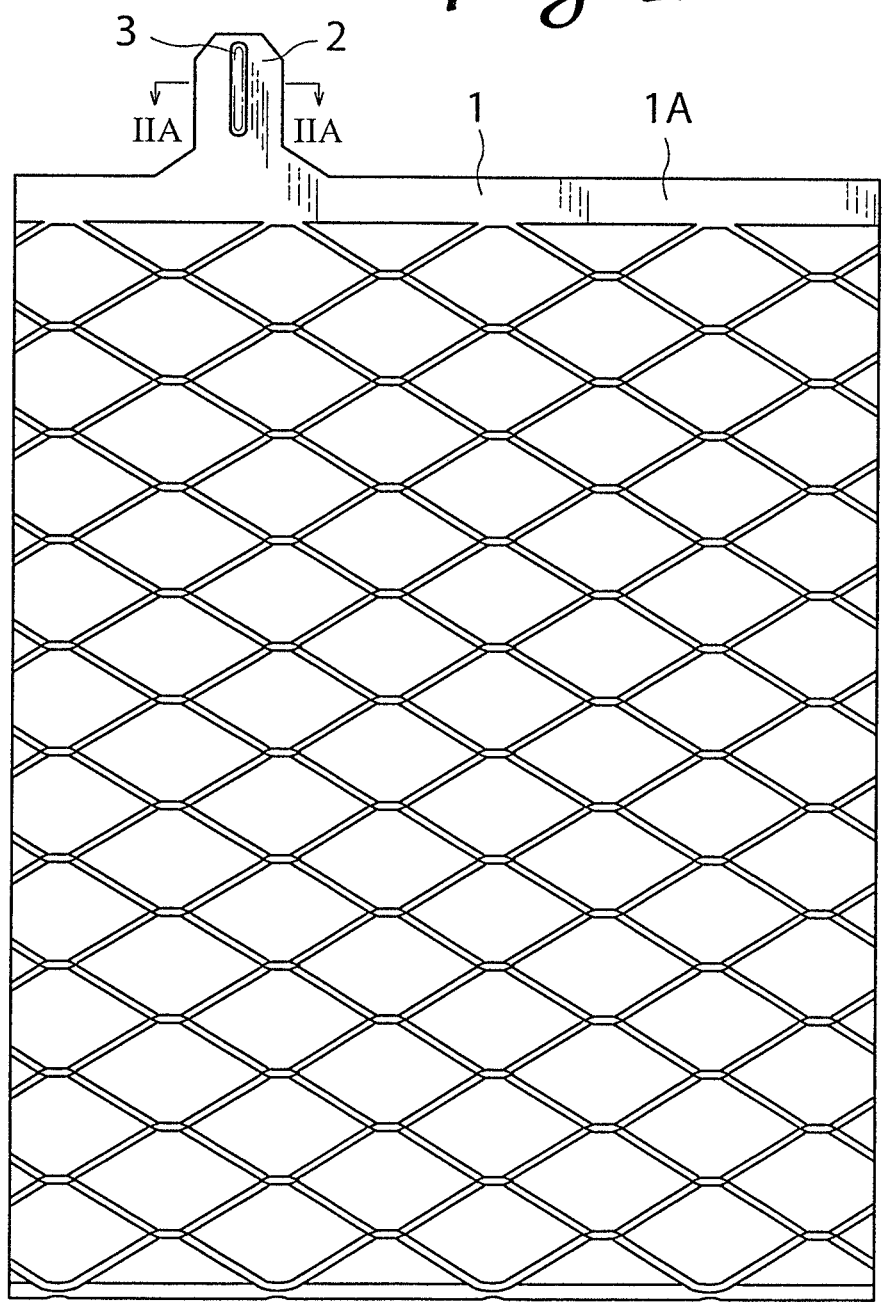

W=W1+W2

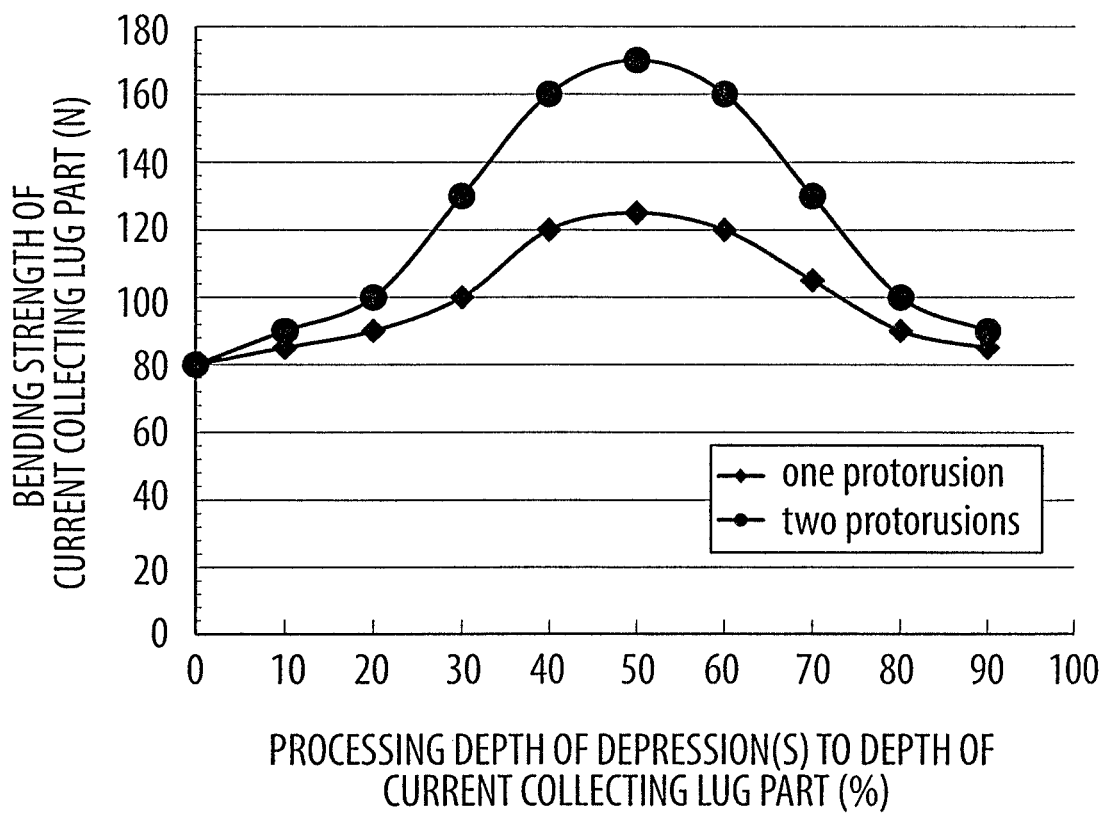

METHOD FOR MANUFACTURING LEAD-ACID BATTERY

CROSS-REFERENCE TO RELATED APPLICATIONS

This application is a divisional application of U.S. application Ser. No. 13/047,153, filed Mar. 14, 2011, the entire contents of which is incorporated herein by reference.

BACKGROUND OF THE INVENTION

1. Field of the Invention

The present invention relates to a lead-acid battery, and in particular to a lead-acid battery that uses plates each including a current collector which is unitarily provided with one or more current collecting lug parts and holds an active material thereon and to a method for manufacturing a current collector for a lead-acid battery.

2. Description of the Related Art

A conventional lead-acid battery is manufactured as follows. A positive plate and a negative plate are prepared. The positive and negative plates each include a current collecting portion unitarily formed with one or more current collecting lug parts at the upper edge thereof and holding an active material thereon. A separator is disposed between the positive plate and the negative plate to form a plate group. Then, the plate group is received in a battery case and an electrolyte is injected into the battery case to obtain a desired lead-acid battery.

There are two types of plate groups, namely, a layered structure type and a wound structure type. The plate group having the layered structure is formed by alternately layering at least one positive plate and at least one negative plate one by one with a microporous separator interposed between adjacent plates. If a plurality of plates of the same polarity are used to form a positive plate group and a negative plate group and the positive plate group and the negative plate group are combined to form a plate group. Current collecting lug parts of positive plates included in the positive plate group are provided on one side across the center line in a layering direction in which the positive plate, the negative plate, and the separator are layered. Current collecting lug parts of negative plates included in the negative plate group are provided on the other side across the center line in the layering direction. Thus, a strap is welded to the current collecting lug parts of the plates having the same polarity to connect the plates having the same polarity to each other.

The plate group having the wound structure is formed by winding one elongated positive plate and one elongated negative plate with a microporous separator interposed between the plates. If a plurality of current collecting lug parts are unitarily provided at a plurality of locations of the elongated positive plate and the elongated negative plate, a strap is welded to the plurality of current collecting lug parts of the plates having the same polarity to connect the plates having the same polarity to each other.

In the lead-acid battery, the positive current collector may be subjected to oxidative corrosion while in use so that the positive plate may be expanded in a height direction (the direction from the current collecting portion toward the current collecting lug part). Since both ends of the plate group in the height direction are restricted in the battery case, a stress due to the expansion may concentrate on the current collecting lug part which has a relatively low strength. As a result, stress corrosion may occur at the current collecting lug part where a stress concentration occurs, thereby accelerating corrosion. In a lead-acid battery mounted on a mobile object such as an automobile, the current collecting lug part is always subjected to a stress due to vibration while in use.

In view of the foregoing, it is feared that the current collecting lug part may be inconveniently broken. In order to eliminate such a risk, the following techniques have been proposed. Japanese Patent Application Publication No. 2003-297414 discloses that a portion is provided at the lower edge of a current collector to be deformed by a stress produced when a positive plate is expanded in the height direction and then to absorb the stress. Japanese Patent Application Publication No. 11-329373 discloses that a thin-walled portion is provided in a battery case so as to be extended following an extension of the positive plate when the positive plate that expanded in the height direction. Japanese Patent Application Publication No. 2008-171701 discloses that the entire surface of a current collecting lug part of a negative current collector is covered with an insulating cover member to prevent a breakage due to vibrations and further to prevent a short circuit even if a breakage should occur.

Further, Japanese Patent Application Publication No. 07-326359 discloses that a rib is provided to extend from the boundary between a current collecting lug part and a current collector frame in the longitudinal direction of the current collecting lug part. The rib is provided for the purpose of preventing the current collecting lug part from being bent before a step for manufacturing a plate group of a lead-acid battery (a step for forming a strap on the current collecting lug parts by burner welding) is performed. The current collecting lug part provided with the rib is configured to be able to withstand a bending pressure to which the current collecting lug part is subjected before the step for manufacturing the plate group is performed. According to the invention disclosed in Japanese Patent Application Publication No. 07-326359, the current collecting lug part is not bent before the step for manufacturing the plate group is performed. Thus, when the current collecting lug parts are set with respect to a metal pad and a metal comb (in a mold for forming a strap) in the step for forming a strap on the current collecting lug parts by burner welding, the current collecting lug parts are not cut, twisted, or otherwise made defective by the slit surface of the metal comb when the current collecting lug parts are bent. The width of each slit of the metal comb is equivalent to the thickness of each current collecting lug part to be inserted into the slit. Therefore, as a matter of course, with the current collecting lug part set with respect to the metal comb, the upper end of the rib extending along the longitudinal direction of the current collecting lug part is located below the lower surface of the metal comb. That is, in a portion of the current collecting lug part that is located directly below the strap formed on the current collecting lug part, the current collecting lug part is not formed with the rib for at least a length that is equivalent to the thickness of the metal comb.

SUMMARY OF THE INVENTION

The techniques disclosed in Japanese Patent Application Publication Nos. 2003-297414, 11-329373, and 2008-171701 all complicate the structure for absorbing expansion of a negative or positive plate or preventing a short circuit. The technique disclosed in Japanese Patent Application Publication No. 07-326359 is made on the assumption that a strap is formed on the current collecting lug parts by burner welding, and is not compatible with the technique to which the present invention pertains as described below (a technique in which a strap is formed on the current collecting lug parts by a cast-on strap casting method).

The lead-acid battery according to the present invention is based on (1) and (2) below.

(1) A plate (a positive plate and a negative plate) is formed using a current collector having a current collecting portion formed by expanding or punching a long lead alloy sheet manufactured by cold rolling, and one or more current collecting lug parts unitarily formed with the current collecting portion.

(2) A strap is formed on the current collecting lug parts of the plates by a cast-on strap casting method.

An object of the present invention is to provide a lead-acid battery that is based on (1) and (2) as mentioned above and that can readily eliminate the risk of a breakage of current collecting lug parts of the plates while the battery is in use.

Another object of the present invention is to provide a method for manufacturing a current collector for such a lead-acid battery.

A lead-acid battery according to the present invention comprises a positive plate group and a negative plate group. The positive plate group and the negative plate group each includes: one or more plates each including a current collector having a current collecting portion formed by expanding or punching a lead alloy sheet manufactured by cold rolling, and one or more current collecting lug parts unitarily formed with the current collecting portion; and a strap formed by a cast-on strap casting method and coupled to the one or more current collecting lug parts. In the present invention, at least the one or more current collecting lug parts included in the positive plate group are each formed with one or more elongated protrusions extending in a direction away from the current collecting portion. The one or more elongated protrusions are formed to protrude on one surface of the current collecting lug part as a result of forming one or more elongated depressions in the other surface of the current collecting lug part at a position corresponding to the one or more elongated protrusions. The one or more elongated protrusions each continuously extend in a direction toward the current collecting portion of the plate from inside the strap.

In the current collector including the current collecting portion formed by expanding or punching a long or elongated lead alloy sheet manufactured by cold rolling and the current collecting lug part unitarily provided on the current collecting portion, lead crystals are refined by the cold rolling. It is revealed, however, that heat produced when a strap is formed on the current collecting lug parts by the cast-on strap casting method recrystallizes the refined crystals which then become larger again, thereby reducing the bending strength of the current collecting lug parts. In particular, when forming a strap by the cast-on strap casting method, tip portions of the current collecting lug parts are immersed in a molten lead poured into a mold for forming a strap, and then the molten lead is solidified to form a strap on the current collecting lug parts. According to the studies made by the inventors, portions of the current collecting lug parts, which are located closely above the molten lead, receive radiant heat from the molten lead having a temperature of 400 to 550° C. and then are re-crystallized. This in turn overgrows lead crystals. The present invention has been made on the basis of such findings. Thus, in the present invention, the current collecting lug parts are each provided with the one or more elongated protrusions discussed above, and the one or more elongated protrusions each continuously extend in a direction toward the current collecting portion of the plate from inside the strap. In other words, the protrusions are provided partially between the strap and the current collecting portion. In this way, portions of the protrusions of the current collecting lug part that are located outside the strap cause a reinforcing effect by serving as ribs against a force by which the current collecting lug part is to be deformed in a direction intersecting the direction away from the current collecting portion or the direction in which the current collecting lug part extend from the current collecting portion (the height direction of the plate). In order for the one or more elongated protrusions to cause the reinforcing effect by serving as ribs, the protrusions should be provided on portions of the current collecting lug part that are located directly adjacent to the lower surface (the surface facing the current collecting portion) of the strap (when the strap is being formed, closely above the surface of a molten lead poured into a mold), because the current collecting lug part tends to be affected by the radiant heat most. Thus, it is important that the one or more elongated protrusions provided on the current collecting lug part extend from inside the strap to outside the strap (toward the current collecting portion).

If a plurality of elongated protrusions are provided, the plurality of elongated protrusions are preferably juxtaposed in a width direction of the current collecting lug part, orthogonal to the direction away from the current collecting portion. More preferably, two or three elongated protrusions are juxtaposed because the width of the current collecting lug part is limited. As a matter of course, the one or more elongated protrusions discussed above may be provided not only on the current collecting lug part of the positive plate but also on the current collecting lug part of the negative plate. The depressions formed to provide the one or more elongated protrusions may be formed in any shape. If the cross-sectional profile of the depression is curved such that the deepest portion of the depression defines an apex of the curved shape, the protrusion can be easily formed.

The protrusion is thus formed on the current collecting lug part and extends from inside the strap to outside the strap. From the viewpoint as described so far, the length of a portion of the protrusion that is located outside the strap is determined so as to correspond to a height range from the surface of the molten lead, which is most affected by the radiant heat from the molten lead, or so as to be wider than such height range. That is, the length of the portion of the protrusion that extends outside the strap may preferably be 5 mm or more from the lower surface of the strap.

The protrusions are formed to protrude on one surface of the current collecting lug part in correspondence with elongated depressions which are formed in the other surface of the current collecting lug part at positions corresponding to the protrusions. The reinforcing effect of the protrusions acting as ribs varies according to the depth and width of the depressions. The depth of the depression for causing the protrusion to swell may preferably be 0.5 to 1.25 mm. The width of the depression (the dimension in the direction orthogonal to the height direction of the plate discussed above and the thickness direction of the current collecting lug part) may preferably be 20 to 80% with respect to the width of the current collecting lug part (the dimension in the direction orthogonal to the height direction of the plate discussed above and the thickness direction of the current collecting lug part).

A current collector used in the lead-acid battery according to the present invention which has the protrusions at the current collecting lug part can be manufactured as follows. A cutting machine may be prepared. The cutting machine includes a first cutting die disposed on a cutting base and having one or more elongated concave portions and a second cutting die having one or more elongated convex portions corresponding to the one or more elongated concave portions. A lead alloy sheet is placed on the first cutting die. Here, the lead alloy sheet includes a portion for forming the current collecting portion and a portion for forming one or more current collecting lug parts. Alternatively, the lead alloy sheet includes a portion having the current collecting portion formed therein and a portion for forming the one or more current collecting lug parts. When placing the lead alloy on the first cutting die, a direction (the height direction of the plate) in which the portion for forming or having the one or more current collecting lug parts formed therein extends away from the portion for forming or having the current collecting portion formed therein should coincide with a direction in which the one or more concave portions extend. Then, the second cutting die is moved toward the first cutting die to form the one or more current collecting lug parts by cutting the lead alloy sheet, and at the same time the one or more convex portions are pressed into the one or more concave portions to form one or more elongated depressions and one or more elongated protrusions on and in each of the one or more current collecting lug parts.

In this manner, the shape of the convex portion of the second cutting die is easily transferred onto the current collecting lug part by a pressing force during the cutting. Consequently, the protrusion is formed on the current collecting lug part to swell on the one surface of the current collecting lug part at a position corresponding to the depression formed in the other surface of the current collecting lug part and to extend longwise in the height direction of the plate. Since the protrusion is formed at the same time as the current collecting lug part is formed, the protrusion can be formed at a precise position compared to when the protrusion is formed in a subsequent process.

If a plurality of elongated protrusions should be formed in parallel, a plurality of elongated concave portions and a plurality of elongated convex portions are respectively provided in the first cutting die and on the second cutting die.

BRIEF DESCRIPTION OF THE DRAWINGS

FIG. 1 is a plan view of a current collector for use in a lead-acid battery according to an embodiment of the present invention.

FIG. 8 is chart showing the relationship between the proportion (%) of the processing width of a depression corresponding to a protrusion on the current collecting lug part to the width of the current collecting lug part and the bending strength of the current collecting lug part.

DESCRIPTION OF THE PREFERRED EMBODIMENTS

Figure 2A:
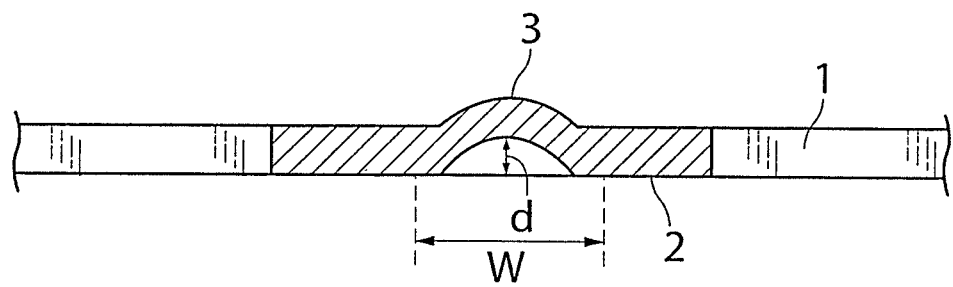
FIG. 2A is a cross-sectional view taken along line IIA-IIA of FIG. 1.
Figure 2B:
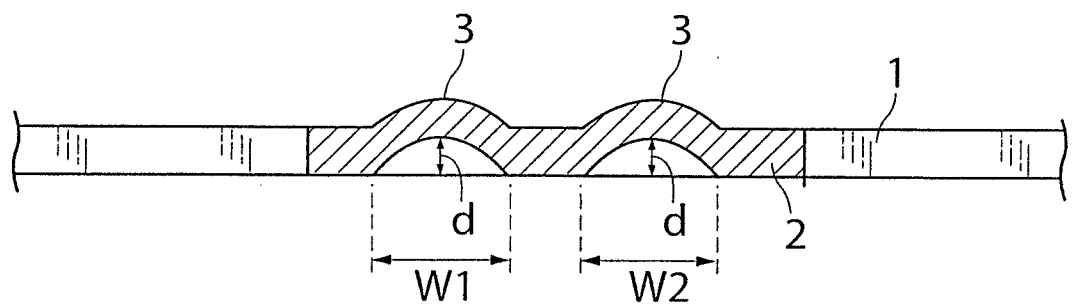
FIG. 2B is a cross-sectional view showing another embodiment in which two elongated protrusions are juxtaposed.

A lead-acid battery according to an embodiment of the present invention will be described below with reference to the drawings. In the lead-acid battery according to the embodiment, a plate (a positive plate and a negative plate) is formed using a current collector. Here, the current collector includes a current collecting portion formed by expanding or punching a long lead alloy sheet manufactured by performing cold rolling on a lead alloy slab and a current collecting lug part unitarily provided on the current collecting portion. That is, an active material is held on a current collector to form a plate. Then, a strap is formed on current collecting lug parts of the plates by a cast-on strap casting method. FIG. 1 shows an example of the current collector obtained by expanding a long lead alloy sheet. A current collecting lug part 2 unitarily provided on a current collecting portion 1A of a current collector 1 is formed with an elongated protrusion (which may hereinafter be referred to simply as a "protrusion") extending in a direction away from the current collecting portion 1A. FIG. 2A is a cross-sectional view taken along line IIA-IIA of FIG. 1. As shown in FIG. 2A, the protrusion 3 is formed to protrude or swell on one surface of the current collecting lug part 2 as a result of forming an elongated depression 30 in the other surface of the current collecting lug part 2 at a position corresponding to the protrusion 3. FIG. 2B is a cross-sectional view showing an embodiment in which two protrusions 3, 3 are juxtaposed on the current collecting lug part 2 with a predetermined gap in the width direction of the current collecting lug part 2, orthogonal to the direction away from the current collecting portion 1A.

When the current collector is manufactured by an expanding process, a long lead alloy sheet obtained by performing cold rolling on a lead alloy slab is prepared. Then, while transferring the lead alloy sheet, slits (that extend in the transfer direction) are sequentially formed in the lead alloy sheet in a staggered arrangement. Next, the lead alloy sheet is expanded in the direction orthogonal to the longitudinal direction of the slits to form a mesh portion for holding an active material. A plurality of current collectors are formed on a single long sheet. In an appropriate process after the expanding process, the sheet is cut into the individual current collectors each unitarily including the current collecting lug parts. For the purpose of subjecting the current collectors to a manufacturing process in which an active material is continuously placed on the current collectors, the individual current collectors are not completely separated but still connected.

Figure 3:
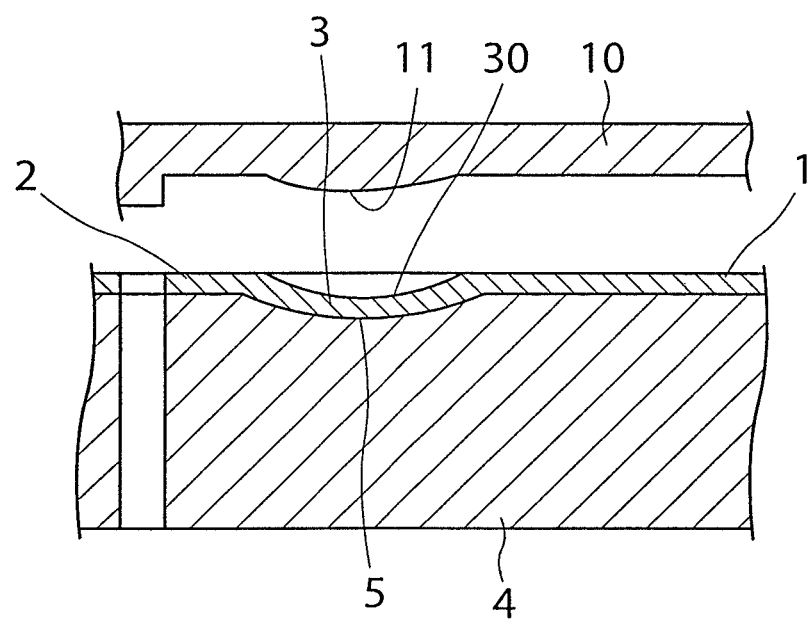
FIG. 3 is a cross-sectional view showing how a protrusion is formed on a current collecting lug part in the embodiment of the present invention.

The protrusion 3 can be formed at the same time as the current collecting lug part 2 is formed by cutting a lead alloy sheet. As shown in FIG. 3, a cutting machine including a first cutting die 4 unitarily disposed on a cutting base and having an elongated concave portion 5 and a second cutting die 10 having an elongated convex portion 11 corresponding to the elongated concave portion 5 is prepared. Then, a lead alloy sheet including a portion for forming the current collecting portion 1A or having the current collecting portion 1A formed therein and a portion for forming the current collecting lug part 2 or having the current collecting lug part 2 formed therein is placed on the first cutting die 4 such that the direction (the height direction of the plate) in which the portion for forming the current collecting lug parts 2 extends away from the portion for forming or having the current collecting portion 1A formed therein coincides with the direction in which the concave portion 5 extends. Then, the second cutting die 10 is moved toward the first cutting die 4 to form the current collecting lug part 2 by cutting the lead alloy sheet, and at the same time the convex portion 11 is pressed into the concave portion 5 to form the elongated depression 30 and the elongated protrusion 3 on and in the current collecting lug part 2.

In this manner, the shape of the convex portion 11 of the second cutting die 10 is easily transferred onto the current collecting lug part 2 by a pressing force during the cutting. Consequently, the protrusion 3 is formed to swell on the one surface of the current collecting lug part 2 at a position corresponding to the depression 30 formed in the other surface of the current collecting lug part 2 and to extend longwise in the height direction of the plate. Since the protrusion 3 is formed at the same time as the current collecting lug part 2 is formed, the protrusion 3 can be formed at a precise position compared to when the protrusion 3 is formed in a subsequent process.

The foregoing describes an example of the current collector formed by the expanding process and the cutting so as to be unitarily provided with the current collecting lug parts for use in a plate. However, a current collector unitarily provided with a current collecting portion and current collecting lug part may be formed by punching a lead alloy sheet.

The plate group is constructed by the plates in which an active material is held on the current collector of either of the above types. The plate groups are assembled in the lead-acid battery. For a layered plate group, the minimum unit of the plate group is composed of one positive plate, one negative plate and one microporous separator. The positive plate and the negative plate are separated by the microporous separator to form a plate group. The plate group is received in a battery case and an electrolyte is injected into the battery case in accordance with the usual method to obtain a desired lead-acid battery.

If the negative plate group includes one or more negative plates and the positive plate group includes one or more positive plates, the one or more positive plates and the one or more negative plates are alternately layered one by one with a microporous separator interposed between adjacent plates to form a plate group. Then, a strap is formed on the current collecting lug parts to connect the plates having the same polarity to each other. In the present application, a group of positive plates, the current collecting lug parts of which are connected by a strap, is defined as the positive plate group. Likewise, a group of negative plates, the current collecting lug parts of which are connected by a strap, is defined as the negative plate group.

Figure 4:
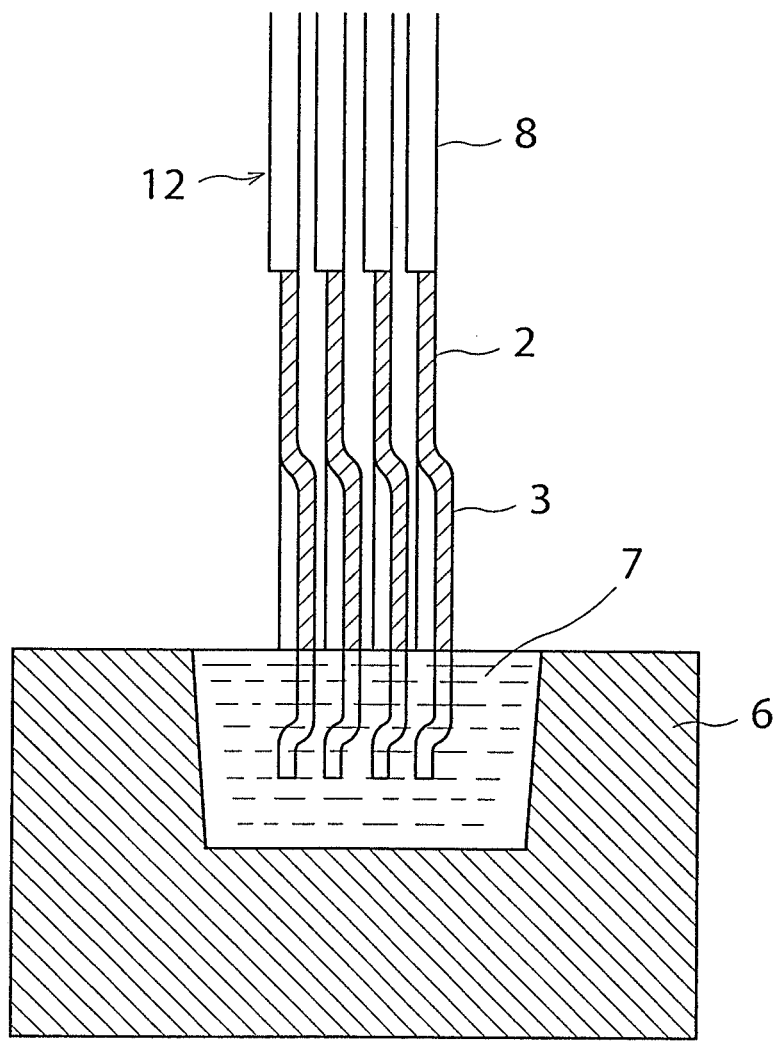
FIG. 4 is a cross-sectional view showing how a strap is formed on current collecting lug parts by a cast-on strap casting method in the embodiment of the present invention.
Figure 5:
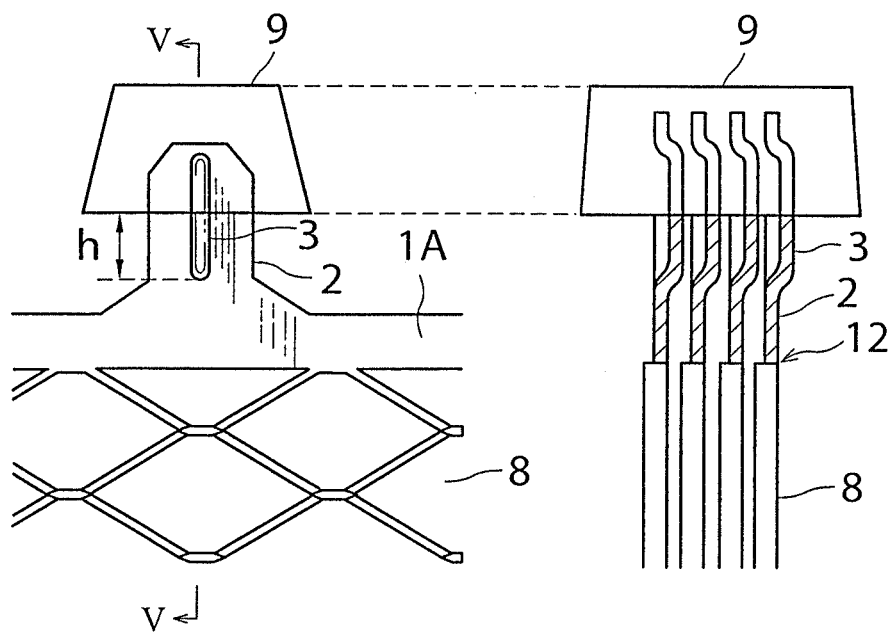
FIG. 5 shows an essential portion of a plate group in which a strap is formed on current collecting lug parts by a cast-on strap casting method in the embodiment of the present invention, wherein a cross-sectional view is shown on the right side, as taken along line V-V of the illustration on the left side.

The strap is formed by the cast-on strap casting method. In the cast-on strap casting method, as shown in FIG. 4, a molten lead 7 is poured into a mold 6 for forming a strap. Next, before the molten lead 7 is solidified, tip portions of the current collecting lug parts 2 of the plates 8 forming the positive plate group or the negative plate group 12 are immersed in the molten lead 7 with the current collecting lug parts 2 oriented downward. As a result, the strap is cast and integrated with the current collecting lug parts 2 at the same time. In the lead-acid battery according to the present invention, the tip portions of the current collecting lug parts 2 including the protrusions 3 are immersed in the molten lead 7. The protrusions 3 continuously extend above the molten lead 7. FIG. 5 shows the strap 9 formed on the current collecting lug parts 2. The protrusions 3 continuously extend toward the current collecting portion 1A from the surface of the strap 9 facing the current collecting portion 1A.

When forming the strap 9 on the current collecting lug parts 2 by the cast-on strap casting method, as shown in FIG. 4, a portion of the current collecting lug part 2 that is located closely above the molten lead 7 is subjected to radiant heat from the molten lead 7 having a temperature of 400 to 550° C. The radiant heat causes lead crystals to be overgrown by recrystallization at the portion of the current collecting lug part 2 that extends from the strap 9. The overgrowth of crystals reduces the bending strength of the current collecting lug part 2. In order to verify the reduction in strength, a plurality of current collecting lug parts that were flat, 0.9-mm thick, and 10-mm wide and that had no protrusion were prepared. The straps were formed on the current collecting lug parts such that lower surfaces of the straps were positioned at different positions in the height direction. Then the bending strength of the portion of each current collecting lug part that was located outside the strap was measured. As a result, it was found that the bending strength of the portion of the current collecting lug part 2 that was located outside the strap 9 was not reduced as the portion of the strap was located farther from the surface of the molten lead 7, and that no significant changes were observed in bending strength at locations 5 mm or more away from the surface of the molten lead 7. The influence of the radiant heat is smaller at a position farther from the surface of the molten lead 7 (the lower surface of the strap 9), and is not substantial at a position 5 mm or more away from the lower surface of the strap 9. This tendency also applies to current collecting lug parts with various thicknesses and widths. Thus, the length of the protrusion 3 below the strap 9 (dimension h in the left part of FIG. 5) is preferably 5 mm or more. The protrusion 3 compensates for the reduction in bending strength due to the overgrowth of crystals, and thus it is necessary that the protrusion 3 should continuously extend from inside the strap 9 to the lower surface of the strap 9 where the reduction in bending strength is the largest.

If a strap is formed by burner welding, the metal comb for setting the current collecting lug parts blocks heat so that only a small amount of heat is conducted to portions of the current collecting lug parts below the metal comb. Therefore, the bending strength of the current collecting lug part is not easily reduced. Therefore, it is presumed that the issue to be addressed by the present invention is not recognized by those skilled in the art who employ burner welding to form a strap. Since the metal comb does not allow setting a slit width to a value obtained by adding the height of the protrusion to the thickness of the current collecting lug part, it is not assumed that the protrusion 3 extends directly from the lower surface of the strap 9.

The plate group formed as described above is received in a battery case and an electrolyte is injected into the battery case in accordance with the usual method to obtain a desired lead-acid battery.

Since the positive plate is easily expanded during use of the battery, it is preferable that at least the positive plates in the layered plate group are provided with the protrusion 3 at the current collecting lug part 2 of the current collector 1.

Figure 6:
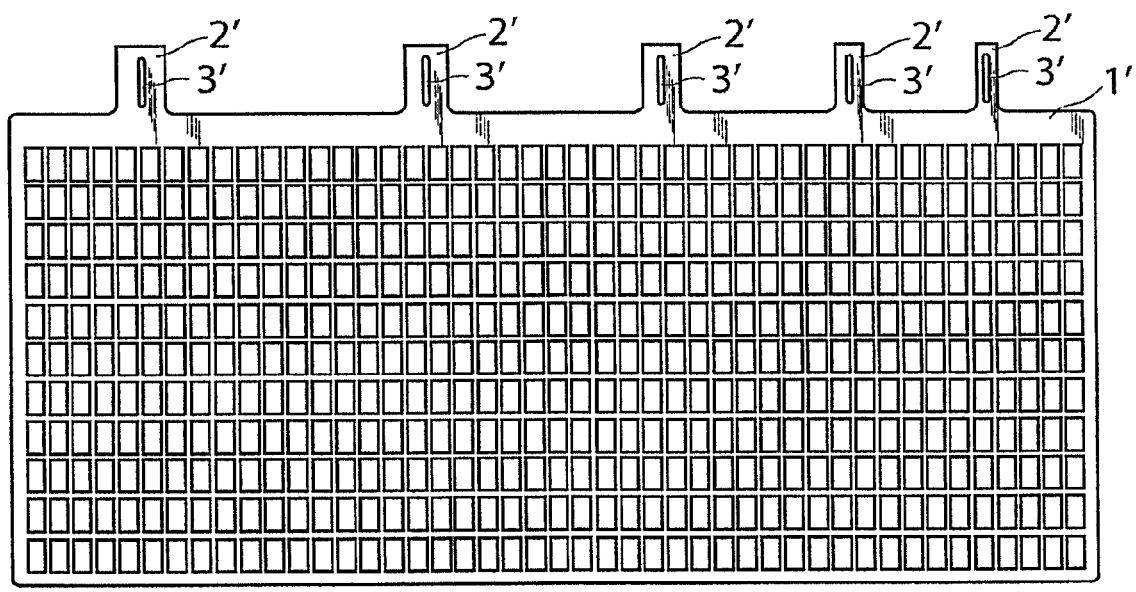
FIG. 6 is a plan view of a plate for use in a lead-acid battery according to another embodiment of the present invention.

The present invention is also effective if applied to a lead-acid battery discussed below that uses a current collector formed by punching a lead alloy sheet manufactured by cold rolling as a plate. FIG. 6 shows an embodiment of a plate for a lead-acid battery that uses a current collector obtained by punching a lead alloy sheet manufactured by performing cold rolling on a lead alloy slab. Current collecting lug parts 2' are unitarily formed at a plurality of locations on the upper edge of a current collector 1' at predetermined intervals. The current collecting lug parts 2' each include a protrusion 3'. One positive plate and one negative plate are wound with a microporous separator interposed between the plates to form a wound plate group. The intervals between the current collecting lug parts 2' formed at a plurality of locations are adjusted such that the plurality of current collecting lug parts 2' of each of the positive plate and the negative plate are arranged in a radial direction at different positions when the positive plate and the negative plate are wound. A strap is formed on the current collecting lug parts 2' by the cast-on strap casting method.

EXAMPLES

Specific examples of the lead-acid battery according to the present invention will be described below using as an example a lead-acid battery that uses a plate in which an active material is held on a current collector formed by the expanding process. Lead-acid batteries according to Conventional Example and Reference Example fabricated for comparison will also be described.

Examples 1 to 9

A lead alloy sheet with a thickness of 0.9 mm manufactured by cold rolling was expanded to prepare a current collector 1 unitarily formed with a current collecting lug part 2. The current collecting lug part 2 was formed with an elongated protrusion 3 with a length of 12 mm by the method described above in relation to the embodiment of the present invention. The protrusion 3 was formed to protrude on one surface of the current collecting lug part 2 with a width of 10 mm in correspondence with an elongated depression 30 formed in the other surface of the current collecting lug part 2 at a position corresponding to the protrusion 3. The width of the depression 30 (dimension w in FIG. 2A) was set to 3 mm, and the depth of the depression 30 (dimension d in FIG. 2A) was varied in the respective examples as shown in Table 1. Using the above respective types of current collectors as positive plates, positive plates and negative plates were alternately layered one by one with a microporous separator interposed between adjacent plates to form a plate group. Then, a strap 9 (with a thickness of 5 mm) was formed on the current collecting lug parts 2 by the cast-on strap casting method. That is, a molten lead 7 at a temperature of 450° C. was poured into a mold for forming a strap, tip portions of the current collecting lug parts 2 were immersed into the molten lead 7, and the molten lead 7 was solidified to form the strap 9. The length of a portion of the current collecting lug parts 2 that was embedded in the strap 9 was 4 mm. The protrusion 3 continuously extends from inside the strap 9 to outside the strap 9, and the length h of a portion of the protrusion 3 that extends from the lower surface of the strap 9 was set to 9 mm. The measurement results of the bending strength of the current collecting lug part 2 of the positive plate (the bending strength of the current collecting lug part 2 in a direction intersecting the height direction of the plate) after forming the strap 9 are shown in Table 1. The bending strength was measured as follows. The current collecting lug part, the tip portion of which was embedded in the strap, was held horizontally with one end kept embedded in the strap and the other end supported on a jig. The current collecting lug part 2 was pressed over the entire width at a location 5 mm away from the lower surface of the strap 9, and the pressing force at which the current collecting lug part 2 was deformed was measured. A measuring machine manufactured by TOYO BALDWIN (model number: RTM-RT) was used.

Examples 10 to 18

Examples 10 to 18 are different from Examples 1 to 9 described above in that two protrusions 3 were juxtaposed. The distance between the bottoms of the depressions 30, 30 was set to 4 mm. The width w of the depressions 30, 30 (the sum of the widths w1 and w2 of the depressions 30, 30 in FIG. 2B) was set to 3 mm. The measurement results of the bending strength of the current collecting lug part 2 of the positive plate after forming the strap 9 are shown in Table 1.

TABLE 1

| EXAMPLE | 1 | 2 | 3 | 4 | 5 | 6 | 7 | 8 | 9 |
|---|---|---|---|---|---|---|---|---|---|
| DEPRESSION DEPTH (mm) | 0.25 | 0.5 | 0.75 | 1.0 | 1.15 | 1.22 | 1.25 | 1.32 | 1.4 |
| BENDING STRENGTH (N) | 82 | 86.5 | 92 | 102 | 113 | 123 | 130 | 160 | 300 |
| EXAMPLE | 10 | 11 | 12 | 13 | 14 | 15 | 16 | 17 | 18 |
| DEPRESSION DEPTH (mm) | 0.25 | 0.5 | 0.75 | 1.0 | 1.15 | 1.22 | 1.25 | 1.32 | 1.4 |
| BENDING STRENGTH (N) | 84 | 93 | 104 | 124 | 146 | 166 | 180 | 240 | 520 |

Examples 19 to 27

Examples 19 to 27 are different from Example 4 (in which the depth d of the depression 30 was set to 1 mm) described above in that the proportion (%) of the width w of the depression 30 to the width of the current collecting lug part 2 was varied in the respective examples as shown in Table 2. The strap 9 was formed by the cast-on strap casting method in the same way as in Examples described above. The bending strength of the current collecting lug part 2 measured in the same way as in Examples described above is shown in Table 2.

Examples 28 to 36

Examples 28 to 36 are different from Example 13 (in which the depth d of the depression 30 was set to 1 mm) described above in that the proportion (%) of the width w of the depression 30 to the width of the current collecting lug part 2 was varied in the respective examples as shown in Table 2. The width w of the depressions 30, 30 is the sum of the widths w1 and w2 of the depressions 30, 30 in FIG. 2B. The strap 9 was formed by the cast-on strap casting method in the same way as in Examples described above. The bending strength of the current collecting lug part 2 measured in the same way as in Examples described above is shown in Table 2.

TABLE 2

| EXAMPLE | 19 | 20 | 21 | 22 | 23 | 24 | 25 | 26 | 27 |
|---|---|---|---|---|---|---|---|---|---|
| DEPRESSION WIDTH (%) | 10 | 20 | 30 | 40 | 50 | 60 | 70 | 80 | 90 |
| BENDING STRENGTH (N) | 85 | 90 | 100 | 120 | 125 | 120 | 105 | 90 | 85 |
| EXAMPLE | 28 | 29 | 30 | 31 | 32 | 33 | 34 | 35 | 36 |
| DEPRESSION WIDTH (%) | 10 | 20 | 30 | 40 | 50 | 60 | 70 | 80 | 90 |
| BENDING STRENGTH (N) | 90 | 100 | 130 | 160 | 170 | 160 | 130 | 100 | 90 |

Conventional Example 1

Conventional Example 1 is different from Examples described above in that the current collecting lug part 2 was flat with no protrusion 3. The strap 9 was formed by the cast-on strap casting method in the same way as in Examples described above. The bending strength of the current collecting lug part 2 measured in the same way as in Examples described above was 80 N.

Reference Example 1

Reference Example 1 is different from Example 23 described above in that no protrusion 3 was provided on a portion of the current collecting lug part 2 that was embedded in the strap 9 and a portion of the current collecting lug part 2 that was located within 2 mm from the lower surface of the strap 9, and in that a protrusion 3 with a length of 8 mm was provided to extend from a point 2 mm away from the lower surface of the strap 9. The strap 9 was formed by the cast-on strap casting method in the same way as in Examples described above. The bending strength of the current collecting lug part 2 measured in the same way as in Examples described above was 80 N, which was not significantly different from the measurement result for Conventional Example 1. This indicates that the effect of reinforcing the current collecting lug part 2 is exhibited only if the protrusion 3 continuously extends from inside the strap 9 to outside the strap 9.

Figure 7:
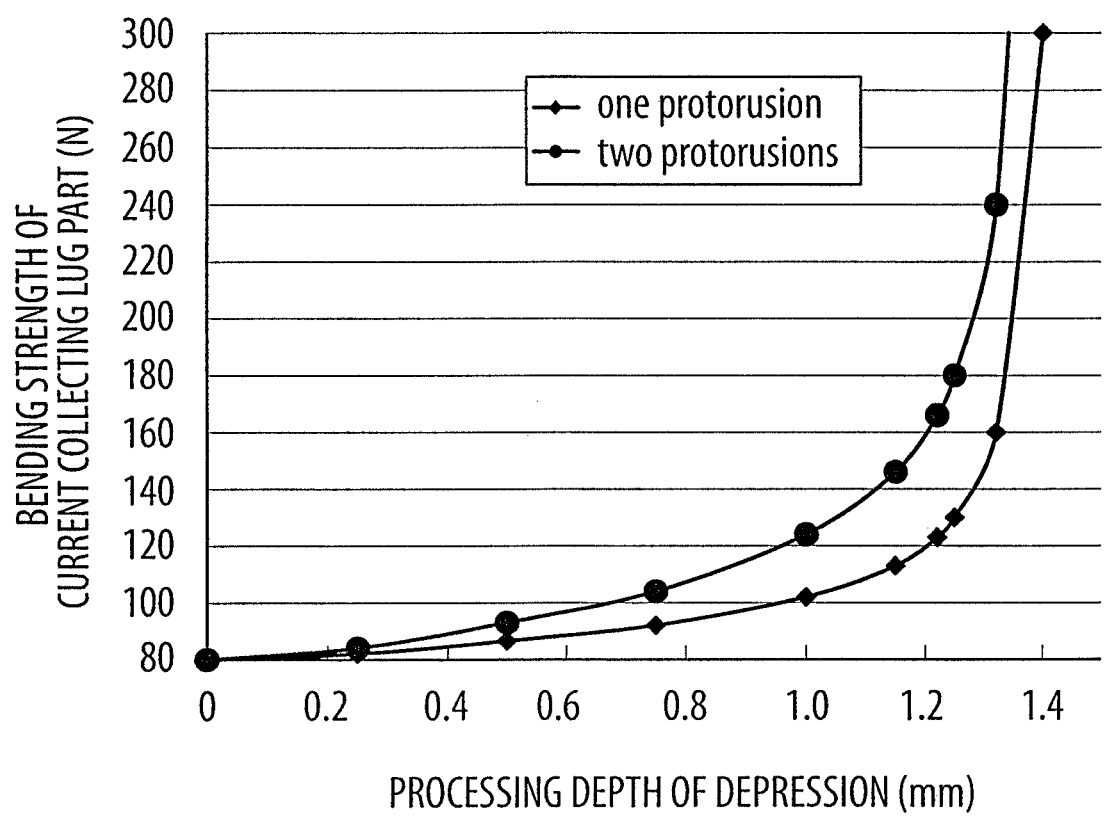
FIG. 7 is a chart showing the relationship between the processing depth of a depression corresponding to a protrusion on the current collecting lug part and the bending strength of the current collecting lug part.

FIG. 7 is a chart showing the relationship between the processing depth of a depression(s) corresponding to a protrusion(s) on the current collecting lug part and the bending strength of the current collecting lug part when comparing two configurations where one protrusion is provided and where two protrusions are juxtaposed on the basis of Table 1. In the chart, the bending strength for a processing depth of 0 on the horizontal axis is equivalent to the value for Conventional Example 1. As can be understood from FIG. 7, the bending strength becomes larger as the processing depth of the depression(s) becomes larger. As can be easily imagined, the side walls of the depression(s) vertically rise up with respect to the plane of the current collecting lug part in a range where the bending strength steeply increases as the processing depth of the depression(s) becomes larger. In this range, the thickness of the side walls of the depression(s) may be uneven. The processing depth of the depression(s) is preferably in such a range that the bending strength is not steeply increasing, that is, 1.25 mm or less. If the processing depth of the depression(s) is 0.5 mm or more, in addition, a current collecting lug part with one protrusion can have a bending strength of 108 to 162% of the bending strength of a current collecting lug part with no projection. Also, a current collecting lug part with two protrusions can have a bending strength of 116 to 225% of the bending strength of a current collecting lug part with no projection.

FIG. 8 is a chart showing the relationship between the proportion (%) of the processing width of a depression(s) corresponding to a protrusion(s) on the current collecting lug part to the width of the current collecting lug part and the bending strength of the current collecting lug part when comparing two configurations where one protrusion is provided and where two protrusions are juxtaposed on the basis of Table 2. As seen from FIG. 8, the proportion of the processing width of the protrusion(s) to the width of the current collecting portion is preferably in the range of 30 to 70%, more preferably in the range of 40 to 60%, in order to improve the bending strength of the current collecting lug part.

While certain features of the invention have been described with reference to example embodiments, the description is not intended to be construed in a limiting sense. Various modifications of the example embodiments, as well as other embodiments of the invention, which are apparent to persons skilled in the art to which the invention pertains, are deemed to lie within the spirit and scope of the invention.

What is claimed is:

1. A method for manufacturing a lead-acid battery, the method comprising:
   manufacturing at least one negative plate comprising a current collector;
   manufacturing at least one positive plate comprising a current collector, the manufacture of the at least one positive plate comprising:
      preparing a cutting machine including a first cutting die disposed on a cutting base and having one or more elongated concave portions, and a second cutting die having one or more elongated convex portions corresponding to the one or more elongated concave portions;
      placing on the first cutting die a lead alloy sheet including a portion where the current collecting portion is to be, or has been, formed and a portion where one or more current collecting lug parts are to be formed such that a direction in which the portion where the one or more current collecting lug parts are to be formed extends away from the portion where the current collecting portion is to be, or has been, formed coincides with a direction in which the one or more concave portions extend; and
      moving the second cutting die toward the first cutting die to form the one or more current collecting lug parts by cutting the lead alloy sheet, and at the same time pressing the one or more convex portions into the one or more concave portions to form one or more elongated depressions and one or more elongated protrusions on and in each of the one or more current collecting lug parts;
providing a plate group comprising the at least one negative plate and the at least one positive plate;
forming a strap coupled to the at least one positive plate by a cast-on strap casting method comprising immersing a portion of the one or more elongated protrusions of the one or more lug parts of the at least one positive plate into molten lead before the molten lead solidifies.

* * * * *